United States Patent
Terhaar et al.

(10) Patent No.: US 10,748,303 B2
(45) Date of Patent: Aug. 18, 2020

(54) REAR FACING LANE DETECTION OVERLAY

(71) Applicant: GENTEX Corporation, Zeeland, MI (US)

(72) Inventors: Micah W. Terhaar, Zeeland, MI (US); Andre J Rieder, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 134 days.

(21) Appl. No.: 16/150,993

(22) Filed: Oct. 3, 2018

(65) Prior Publication Data
US 2020/0111230 A1   Apr. 9, 2020

(51) Int. Cl.
| | |
|---|---|
| *G06T 7/73* | (2017.01) |
| *G08G 1/16* | (2006.01) |
| *B60R 1/04* | (2006.01) |
| *G06T 7/13* | (2017.01) |
| *B60R 1/12* | (2006.01) |

(52) U.S. Cl.
CPC ............... *G06T 7/75* (2017.01); *B60R 1/04* (2013.01); *B60R 1/12* (2013.01); *G06T 7/13* (2017.01); *G08G 1/167* (2013.01); *B60R 2001/1215* (2013.01); *B60R 2300/103* (2013.01); *B60R 2300/804* (2013.01); *B60R 2300/8066* (2013.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 8,543,254 | B1 * | 9/2013 | Schut | B60T 7/22 348/135 |
| 9,098,751 | B2 * | 8/2015 | Hilldore | G06K 9/00798 |
| 2012/0221168 | A1 * | 8/2012 | Zeng | G08G 1/16 701/1 |
| 2012/0314070 | A1 * | 12/2012 | Zhang | B60W 40/00 348/148 |
| 2015/0294163 | A1 * | 10/2015 | Sakamoto | G06K 9/00798 382/103 |
| 2015/0321665 | A1 * | 11/2015 | Pandita | G06K 9/00798 701/409 |
| 2016/0314360 | A1 * | 10/2016 | Kizumi | B62D 15/025 |

FOREIGN PATENT DOCUMENTS

JP       2014085693 A   *   5/2014

* cited by examiner

*Primary Examiner* — Mohammed Rachedine
(74) *Attorney, Agent, or Firm* — Price Heneveld LLP; Bradley D. Johnson

(57) ABSTRACT

A rearward lane display system includes an image sensor configured to capture one or more images including lane markers forward of a vehicle, one or more display mirrors, and a processor in communication with the image sensor and the display mirrors, where the processor is configured to process the one or more images to predict where the lane markers will appear rearward of the vehicle, and display representations of the predicted lane markers in the one or more display mirrors.

20 Claims, 7 Drawing Sheets

REAR FACING LANE DETECTION OVERLAY

FIELD

The disclosed embodiments relate generally to a driver assist system and method thereof, and more particularly, to a system for rearward lane marker identification and tracking.

BACKGROUND

Because there is typically very little illumination of the road surface behind a vehicle, it may be difficult to distinguish lane lines and the location of other vehicles with respect to the lane lines, when using rearview mirrors.

SUMMARY

The disclosed embodiments are directed to a rearward lane display system including an image sensor configured to capture one or more images including lane markers forward of a vehicle, one or more display mirrors, and a processor in communication with the image sensor and the display mirrors, where the processor is configured to process the one or more images to predict where the lane markers will appear rearward of the vehicle, and display representations of the predicted lane markers in the one or more display mirrors.

The image sensor may include a camera with an infrared light source.

The one or more display mirrors may include an interior rearview mirror assembly.

The one or more display mirrors may include a side exterior rearview mirror assembly.

The one or more display mirrors may include a partially reflective and partially transmissive electro-optic mirror element, and a display configured to provide an overlay of the predicted lane markers.

The processor may be configured to process the one or more images captured from the image sensor by receiving a present image from the image sensor, determining coordinates of lane marker edge points in the present image, modifying the coordinates to reflect a change in vehicle orientation between receiving the present image and a previous image, and fitting lines to the modified coordinates for display in the one or more display mirrors.

Determining coordinates of lane marker edge points in the present image may include utilizing a lane marker detector to identify lane marker positions.

Modifying the coordinates to reflect a change in vehicle orientation between receiving the present image and a previous image may include establishing a coordinate system of the vehicle where an x-axis extends to the left and right of the vehicle, a y-axis extends below and above the vehicle, and a z-axis extends to a front and rear of the vehicle, rotating the coordinates about the x, y, and z axes, and translating the coordinates along the z axis.

Modifying the coordinates to reflect a change in vehicle orientation between receiving the present image and a previous image may include removing lane marker edge points that exceed a predetermined distance from the vehicle.

Fitting lines to the modified coordinates for display in the one or more display mirrors may include using a model including one or more of a pair of polynomials which compute an X and Y value for a given z value, a least squares regression, a linear regression, a Theil-Sen estimator.

The disclosed embodiments are further directed to a method for displaying rearward lane markers, the method including capturing one or more images including lane markers forward of a vehicle, processing the one or more images to predict where the lane markers will appear rearward of the vehicle, and displaying representations of the predicted lane markers in one or more display mirrors.

The method may include using a camera with an infrared light source to capture the one or more images.

The method may include providing an overlay of the predicted lane markers on a partially reflective and partially transmissive electro-optic mirror element.

The method may include displaying representations of the predicted lane markers using an interior rearview mirror assembly.

The method may include displaying representations of the predicted lane markers using a side exterior rearview mirror assembly.

Processing the one or more images captured from the image sensor may include receiving a present image from the image sensor, determining coordinates of lane marker edge points in the present image, modifying the coordinates to reflect a change in vehicle orientation between receiving the present image and a previous image, and fitting lines to the modified coordinates for display in the one or more display mirrors.

Determining coordinates of lane marker edge points in the present image may include utilizing a lane marker detector to identify lane marker positions.

Modifying the coordinates to reflect a change in vehicle orientation between receiving the present image and a previous image may include establishing a coordinate system of the vehicle where an x-axis extends to the left and right of the vehicle, a y-axis extends below and above the vehicle, and a z-axis extends to a front and rear of the vehicle, rotating the coordinates about the x, y, and z axes, and translating the coordinates along the z axis.

Modifying the coordinates to reflect a change in vehicle orientation between receiving the present image and a previous image may include removing lane marker edge points that exceed a predetermined distance from the vehicle.

Fitting lines to the modified coordinates for display in the one or more display mirrors may include using a model including one or more of a pair of polynomials which compute an x and y value for a given z value, a least squares regression, a linear regression, a Theil-Sen estimator.

These and other aspects, objects, and features of the present disclosure will be understood and appreciated by those skilled in the art upon studying the following specification, claims, and appended drawings. It will also be understood that features of each example disclosed herein may be used in conjunction with, or as a replacement for, features of the other examples.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
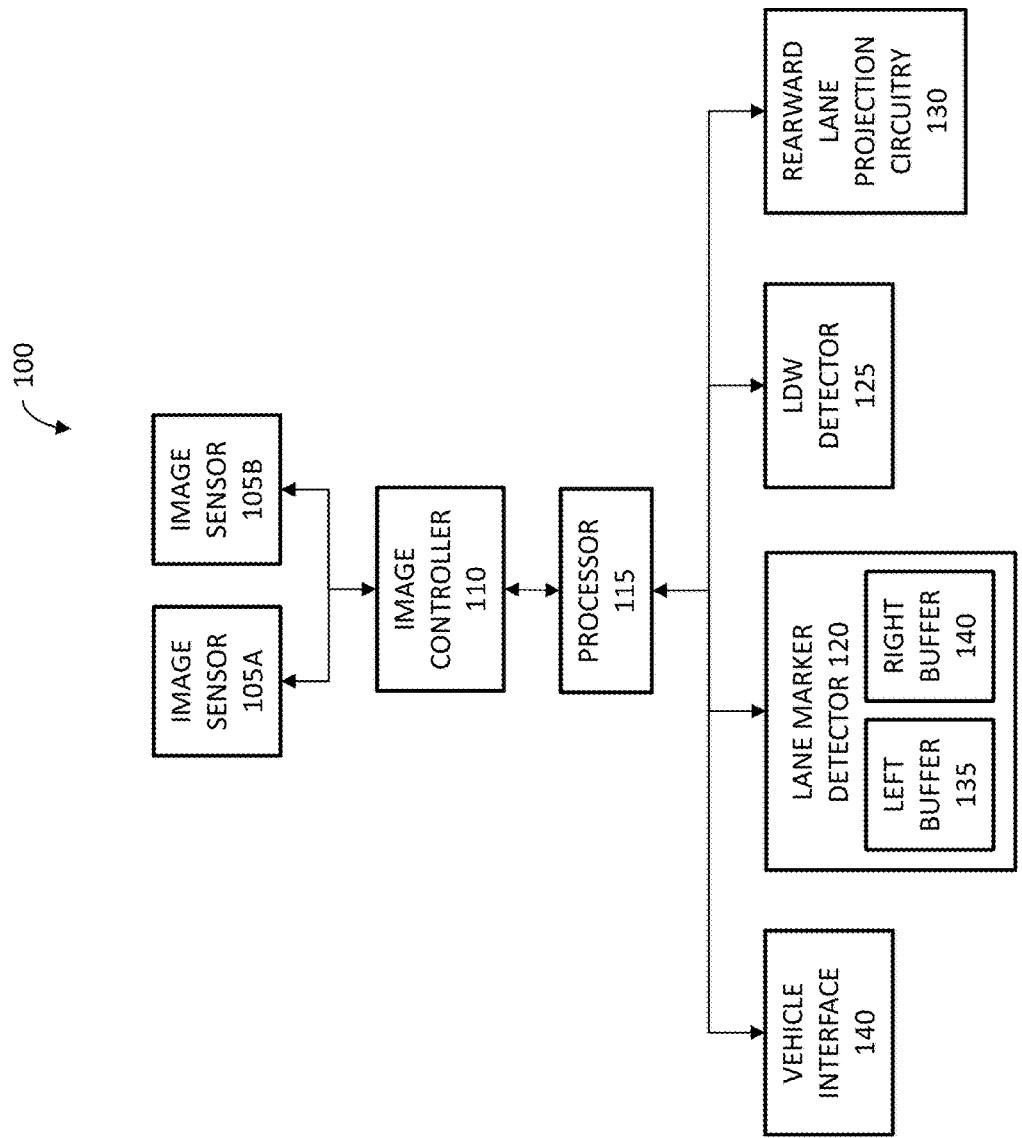
FIG. 1 shows a block diagram of an exemplary vehicle control system in accordance with the disclosed embodiments.

Before describing in detail embodiments that are in accordance with the present invention, it should be observed that the embodiments reside primarily in combinations of method steps and apparatus components related to a vehicular system for determining roadway lane markers. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a vehicular system and method for determining roadway lane markers as described herein. The non-processor circuits may include, but are not limited to signal drivers, clock circuits, power source circuits, and user input devices. As such, these functions may be interpreted as steps of a method to determine roadway lane markers. Alternatively, some or all functions could be implemented by a state machine that has no stored program instructions, or in one or more application specific integrated circuits (ASICs) or field programmable gate array (FPGA), in which each function or some combinations of certain of the functions are implemented as custom logic. It should be understood that a combination of any number of approaches may be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions, programs and integrated circuits with minimal experimentation.

FIG. 1 shows a block diagram of an exemplary vehicle control system 100 in accordance with the disclosed embodiments. The control system 100 may include a forward facing image sensor 105A, a rearward facing image sensor 105B, an image controller 110, a processor 115, a lane marker detector 120, a lane departure detector 125, rearward lane projection circuitry 130, and a vehicle interface 140. The lane marker detector 120 includes a left buffer 135 for storing left lane marker edge points and a right buffer 140 for storing right lane marker edge points.

The forward facing image sensor 105A and the rearward facing image sensor 105B may be cameras incorporating charge coupled devices or CMOS devices. The forward facing image sensor 105A and the rearward facing image sensor 105B may also include one or more light sources, for example, near infrared light sources, and may generally operate to provide a series of image frames. Exemplary image sensors may include those described in U.S. Pat. No. 7,432,967, entitled "Control Circuit for Image Array Sensors," U.S. Pat. No. 6,008,486, entitled "Wide Dynamic Range Optical Sensor," U.S. Pat. No. 7,567,291, entitled "Vehicle Vision System," U.S. Pat. No. 7,683,326, entitled "Vehicle Vision System with High Dynamic Range," U.S. Pat. No. 7,423,821, entitled "Improved Vision System," and U.S. Pat. Nos. 8,289,430 and 8,305,471, both entitled "Improved Imaging Device," all of which are incorporated by reference herein in their entirety.

The image controller 110 may control and receive data from the forward facing image sensor 105A and the rearward facing image sensor 105B, and may also serve to perform pre-processing functions such as image auto-exposure, dynamic range compression, filtering, and color computation.

The processor 115 may be a microprocessor configured discreetly or instantiated using, for example, one or more components such as FPGAs, or a combination of discrete components and FPGAs or the like. The processor 115 may request images from the image controller 106 and may also be enabled to directly control and receive images from the forward facing image sensor 105A and the rearward facing image sensor 105B. The lane marker detector 120 and lane departure detector 125 receive the image frames produced by the forward facing image sensor 105A, where the lane marker detector 120 may operate to identify a lane marker position on a roadway, and the lane departure detector 125 may operate to detect a departure from a driving lane. The rearward lane projection circuitry 130 may operate on data from one or more of the lane marker detector 120 and the lane departure detector 125 to provide an image of roadway lanes behind a vehicle to be superimposed on images captured by the rearward facing image sensor 105B.

In some embodiments, the lane marker detector 120, the departure detector 125, and the rearward lane projection circuitry 130 may be implemented in computer code embodied on a medium readable by the processor 115, and the processor 115 may be configured to perform lane marker and lane departure detection, and to provide a rearward projection of roadway lanes. In other embodiments, the lane marker detector 120, lane departure detector 125, and rearward lane projection circuitry 130 may be embodied as discrete circuitry including one or more processors, memories, state machines, ASICs, FPGAs, or other components that may operate to perform the functions described herein.

Typical systems for lane marker detection and lane departure detection may include those described in U.S. Pat. No. 7,881,839, entitled "Image Acquisition and Processing Systems for Vehicle Equipment Control," U.S. Pat. No. 8,543,254, entitled "Vehicular Imaging System and Method for Determining Roadway Width," U.S. Pat. No. 9,098,751, entitled "System and Method for Periodic Lane Marker Identification and Tracking," and U.S. Pat. No. 9,230,183, entitled "Automatic Vehicle Equipment Monitoring, Warning, and Control System," all of which are incorporated by reference herein in their entirety. Information from the lane marker detector 120 may be projected for viewing, for example, using a heads up display.

Figure 6:
FIG. 6 shows an exemplary forward display of system identified left and right lane markers.

FIG. 6 shows an exemplary display of identified left and right lane markers 605, 610 that might be viewed through a windshield or displayed on a windshield of the vehicle.

The vehicle interface 140 may operate to receive various vehicle parameters from other vehicle systems, including parameters such as speed, pitch, roll, yaw, steering wheel position, and vehicle direction, and provide those parameters to the lane marker detector 120, lane departure detector 125, and rearward lane projection circuitry 130.

Figure 2:
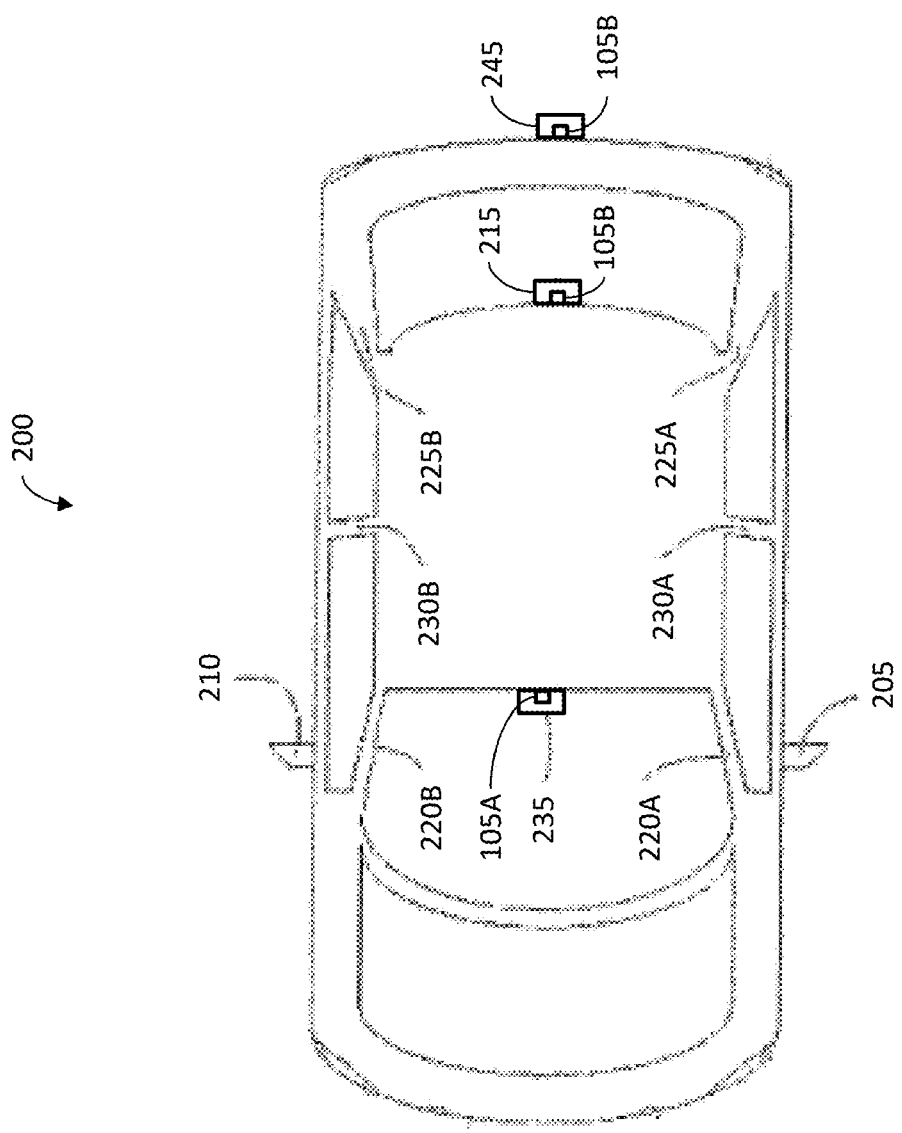
FIG. 2 depicts a diagram of a vehicle incorporating the disclosed embodiments.

FIG. 2 depicts a diagram of a vehicle 200 incorporating the disclosed embodiments. The vehicle 200 may include a left side exterior rearview mirror assembly 205, a right side exterior rearview mirror assembly 210, a center high mounted stop light 215, A-pillars 220*a*, 220*b*, B-pillars 225*a*, 225*b*, C-pillars 230*a*, 230*b*, and an interior rearview mirror assembly 235. It should be understood that the exterior rearview mirror assemblies 205, 210, and the interior review mirror assembly 235 may be automatic dimming electro-optic mirrors, and may incorporate one or more displays as will be explained below. It should also be understood that while the forward facing image sensor 105A, image controller 110, processor 115, lane marker detector 120, and lane departure detector 125 may be positioned in any suitable location, in some embodiments, the forward facing image sensor 105A, image controller 110, processor 115, lane marker detector 120, and lane departure detector 125 may be located near, on, or within any of the left side exterior rearview mirror assembly 205, right side exterior rearview mirror assembly 210, center high mounted stop light 215, A-pillars 220*a*, 220*b*, B-pillars 225*a*, 225*b*, C-pillars 230*a*, 230*b*, and the interior rearview mirror assembly 235.

In some embodiments, the forward facing image sensor 105A may be located on a mount of the interior rearview mirror assembly 235, and in one or more embodiments the image controller 110 and the processor 115 may be co-located with the forward facing image sensor 105A. In one or more embodiments, the rearward facing image sensor 105B may be located in the center high mounted stop light 215, or located in a mount 245 on the rear of the vehicle 200.

Figure 3:
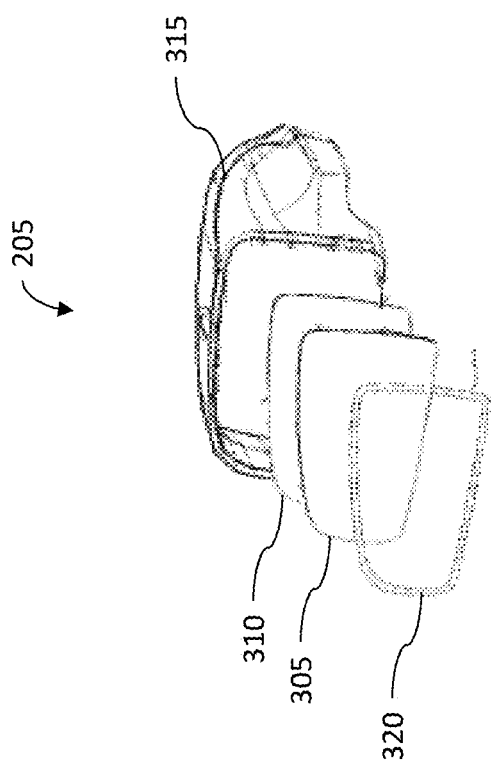
FIG. 3 depicts various components of an example of an exterior rearview mirror assembly.

FIG. 3 depicts various components of an example of the left side exterior rearview mirror assembly 205 according to the disclosed embodiments. The left side exterior rearview mirror assembly 205 may include an electro-optic mirror element 305 and an exterior rearview display 310 mounted within a housing 315. The left side exterior rearview mirror assembly 205 may also include one or more filters 320, electrical connections, mounts, and other components for mounting the exterior rearview mirror assembly 300 to the vehicle 200 and for providing a side rearview of the vehicle 200. The electro-optic mirror element 305 may be partially reflective and partially transmissive such that information displayed by the exterior rearview display 310 is visible. The exterior rearview display 310 may utilize LCD, LED, OLED, plasma, DLP, or any suitable display technology and at least operates to provide an overlay of information supplemental to a reflected image provided by the electro-optic mirror element 305. In some embodiments, the exterior rearview display 310 may provide a partial side rearview that may be provided by the rearward facing image sensor 105B and may include predicted lane marker indications, while in other embodiments, the exterior rearview display 310 may provide an entire side rearview including the predicted lane marker indications. It should be understood that the right side exterior rearview mirror assembly 210 may include the same components and may provide the same partial or entire view.

Figure 4:
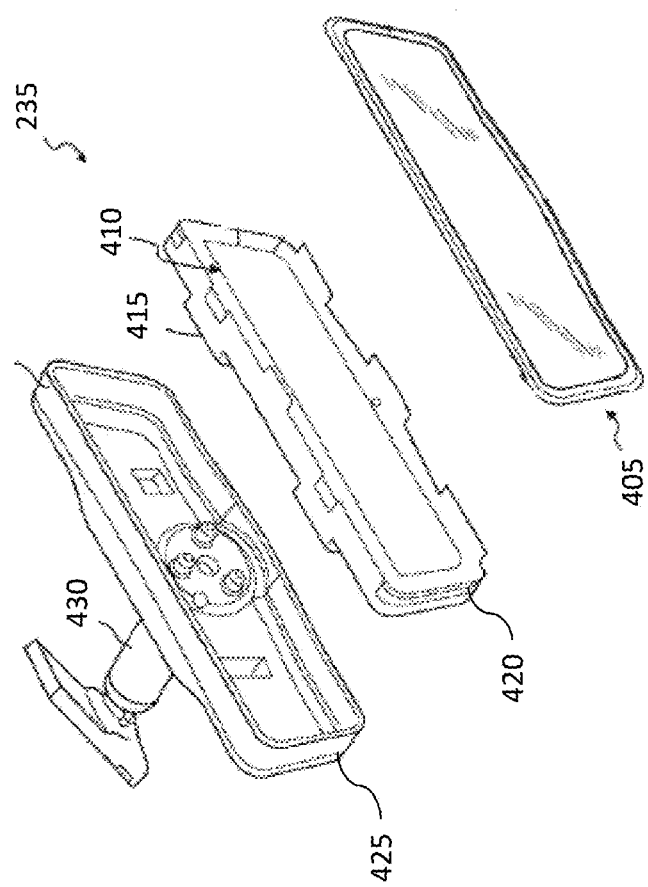
FIG. 4 illustrates an example of an interior rearview mirror assembly.

FIG. 4 illustrates an example of the interior rearview mirror assembly 235 according to the disclosed embodiments. The interior rearview mirror assembly 235 may include an electro-optical element 405, a front shield 410 and a rear shield 415 enclosing an interior rearview display 420, a housing 425, and a mounting member 430. The electro-optic mirror element 405 of the interior rearview mirror assembly 235 may be partially reflective and partially transmissive in order for information displayed by the interior rearview display 410 to be visible to a user. The interior rearview display 410 may utilize LCD, LED, OLED, plasma, DLP, or any suitable display technology and at least operates to provide an overlay of information supplemental to a reflected image provided by the electro-optic mirror element 405. In some embodiments, the interior rearview display 410 may occupy only a portion of a surface of the electro-optic mirror element 405 and display a partial rearview provided by the rearward facing image sensor 105B that includes predicted lane marker indications, while in other embodiments, the interior rearview display 410 may occupy a substantial portion or approximately all of the surface of the electro-optic mirror element 405 and may provide an entire rearview provided by the rearward facing image sensor 105B that includes the predicted lane marker indications. Exemplary interior rearview mirror assemblies may include those described in U.S. Pat. No. 9,598,018, entitled "Display Mirror Assembly," and U.S. Patent Application No. 2017/00880055, entitled "Full Display Mirror," all of which are incorporated by reference herein in their entirety.

As mentioned above, the rearward lane projection circuitry 130 may operate on data from one or more of the lane marker detector 120 and the lane departure detector 125 to provide a display of roadway lanes that are behind the vehicle 200. For purposes of the disclosed embodiments, a coordinate system relative to the vehicle 200 is defined in terms of a three dimensional coordinate system with an origin at a point on the ground, centered between two rear tires of the vehicle 200. Each point in the coordinate system is defined in terms of (x,y,z) relative to the origin, where an x-axis extends to the left and right of the vehicle, where x is a distance to the right of the vehicle center and −x is a distance to the left of the vehicle center, a y-axis extends below and above the vehicle, where y is a distance below ground level and −y is a distance above ground level, and a z-axis extends to the front and rear of the vehicle, where z is a distance toward the front of the vehicle 200 and −z is a distance toward the rear of the vehicle 200. The rearward facing image sensor 105B position and orientation may be calibrated relative to the vehicle's coordinate system. In addition, the focal length, optical center, and lens distortion coefficients of the rearward facing image sensor 1058 may also be calibrated.

Figure 5:
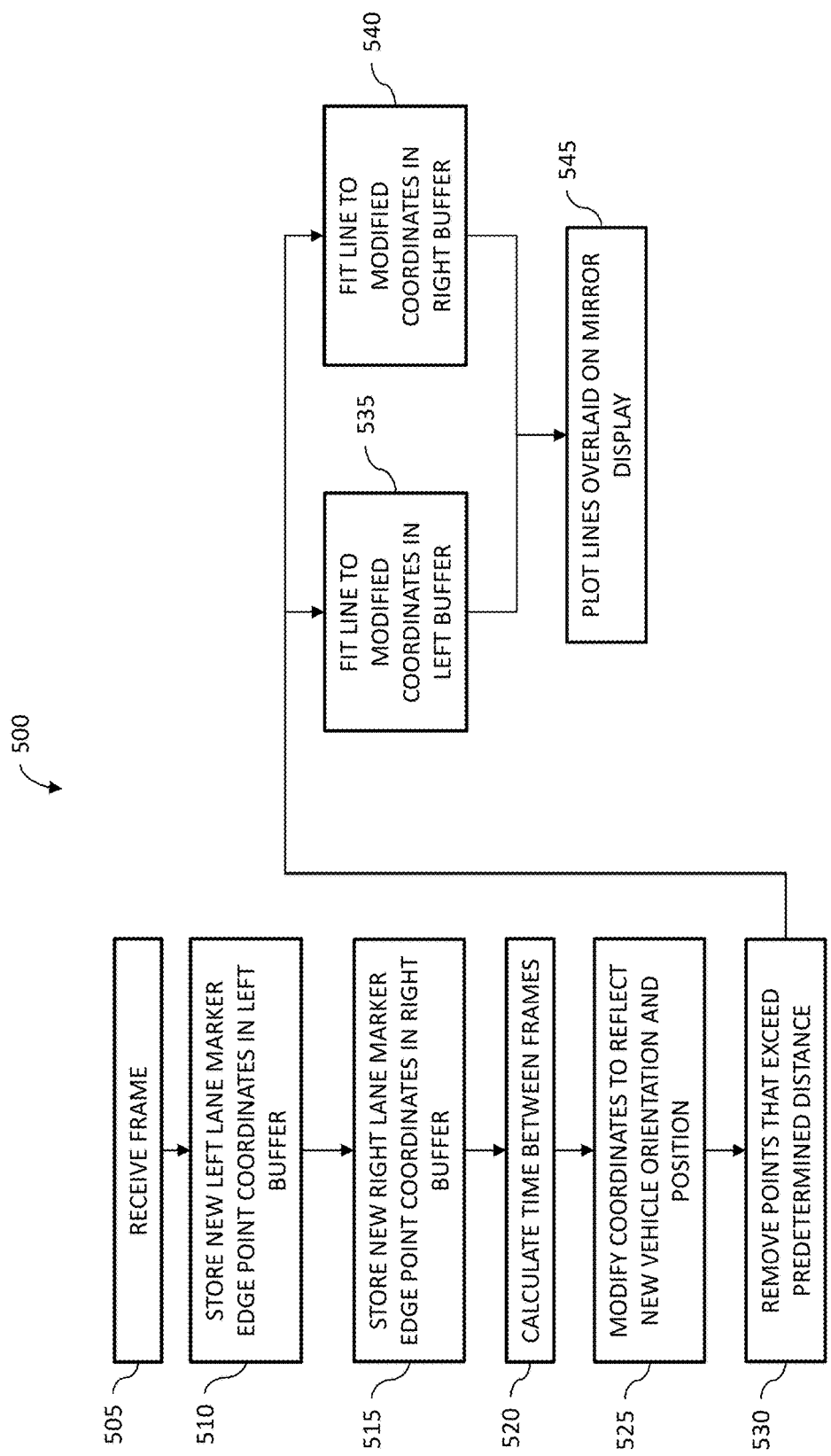
FIG. 5 shows a procedure for predicting and displaying rearward lane marker appearance.

FIG. 5 shows a procedure 500 for predicting where the lane markers will appear rearward of the vehicle 200 and displaying the lane markers for a user.

The lane marker detector 120 receives image frames from the forward facing image sensor 105A as shown in block 505. As each new frame is received, coordinates of points on the left lane marker, referred to as left edge points, in the image frame are determined within the coordinate system relative to the vehicle 200 and are stored in the left buffer 135, as shown in block 510. Coordinates of points on the right lane marker, referred to as right edge points, in the image frame are determined within the coordinate system relative to the vehicle 200 and are stored in the right buffer 140, as shown in block 515. As each frame is received, the rearward lane projection circuitry 130 calculates an amount of time between receiving the present frame and the previous frame, as shown in block 520.

In some embodiments, the forward facing image sensor 105, the image controller 110, or the processor 115 may time stamp frames as they are generated or retrieved, and the lane marker detector 120 may use the time stamps to calculate the amount of time between successive frames. In other embodiments, the lane marker detector 120 may reference a clock signal, or perform some other operation to calculate the amount of time between receiving frames.

As shown in block 525, the lane marker detector 120 performs the following operations on the coordinates of each of the edge points stored in the left and right buffers 135, 140 to reflect changes in vehicle orientation and position between receiving a present fame and a previous frame:

the coordinates for each edge point are rotated about the y axis (yaw) using the following matrix $$\begin{bmatrix} \cos(r_y) & 0 & \sin(r_y) \\ 0 & 1 & 0 \\ -\sin(r_y) & 0 & \cos(r_y) \end{bmatrix} \begin{bmatrix} x \\ y \\ z \end{bmatrix}$$

the coordinates for each edge point are rotated about the x axis (pitch) using the following matrix $$\begin{bmatrix} 1 & 0 & 0 \\ 0 & \cos(r_x) & -\sin(r_x) \\ 0 & \sin(r_x) & \cos(r_x) \end{bmatrix} \begin{bmatrix} x \\ y \\ z \end{bmatrix}$$

each edge point is rotated about the z axis (roll) using the following matrix; and $$\begin{bmatrix} \cos(r_z) & -\sin(r_z) & 0 \\ \sin(r_z) & \cos(r_z) & 0 \\ 0 & 0 & 1 \end{bmatrix} \begin{bmatrix} x \\ y \\ z \end{bmatrix}$$

each edge point is translated along the z axis (speed) using the following matrix $$\begin{bmatrix} x \\ y \\ z \end{bmatrix} - \begin{bmatrix} 0 \\ 0 \\ \dfrac{\text{speed}}{\text{time}} \end{bmatrix}$$

Alternately, the operations on the coordinates of each of the edge points stored in the left and right buffers 135, 140 may be compiled into a single matrix multiplication:

$$\begin{bmatrix} c_y c_z - s_x s_y s_z & -c_x s_z & s_y c_z + s_x c_y s_z & 0 \\ c_y s_z + s_x s_y c_z & c_x c_z & s_y s_z - s_x c_y c_z & 0 \\ -c_x s_y & s_z & c_x c_y & -\dfrac{\text{speed}}{\text{time}} \end{bmatrix} \begin{bmatrix} x \\ y \\ z \\ 1 \end{bmatrix}$$

Points in the left and right buffers 135, 140 that exceed a particular distance from the vehicle as a result of vehicle travel may then be removed from the buffers as shown in block 530. As a non-limiting example, points that are more than 50 meters behind the vehicle 200 may be removed A model may then be used to fit a line to the modified coordinates in each buffer independently as shown in blocks 535 and 540. For example, in some embodiments, a pair of polynomials which compute an X and Y value for a given z value may be used. For example, $f_x(z)=a_3 z^3+a_2 z^2+a_1 z+a_0$ and $f_y(z)=b_3 z^3+b_2 z^2+b_1 z+b_0$ may be used. In other embodiments, a least squares regression, a linear regression, a Theil-Sen estimator, or any suitable modeling technique may be utilized to fit a line to the modified coordinates.

Figure 7:
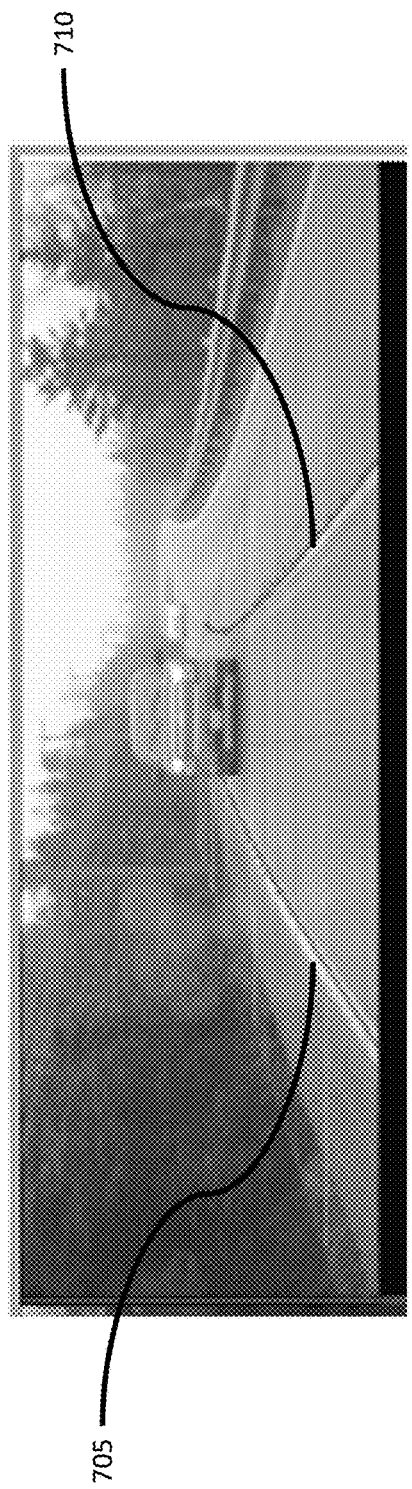
FIG. 7 illustrates an exemplary view of modeled lane lines overlaid on an interior rearview display.

As shown in block 545, the modeled fitted lines may then be plotted over the view shown on the interior rearview display 410. In some embodiments, a projection matrix may be used to determine pixels of the review display 410 corresponding to points of the modeled fitted lines. FIG. 7 illustrates an exemplary view shown on the interior rearview display 410 including the modeled fitted lines 705, 710.

Figure 8:
FIG. 8 depicts a left side modeled lane line overlaid on a left side exterior rearview display.
Figure 9:
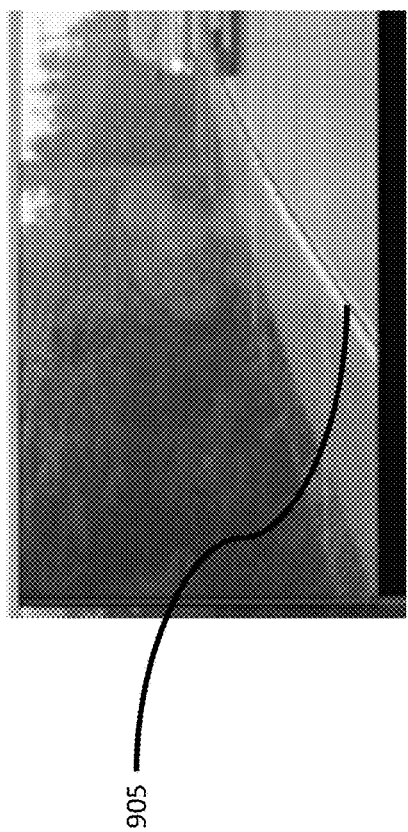
FIG. 9 depicts a right side modeled lane line overlaid on a right side exterior rearview display.

Optionally, the line fitted to the modified coordinates in the left buffer may be overlaid in the view provided by the left side exterior rearview mirror assembly 205, as shown in FIG. 8, and the line fitted to the modified coordinates in the right buffer may be overlaid in the view provided by the right side exterior rearview mirror assembly 210, as shown in FIG. 9. Other image operations, such as enhancing contrast around the modeled fitted lines, or increasing brightness may also be performed.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A rearward lane display system comprising:
   an image sensor configured to capture one or more images including lane markers forward of a vehicle;
   one or more display mirrors; and
   a processor in communication with the image sensor and the display mirrors, wherein the processor is configured to:
      process the one or more images to predict where the lane markers will appear rearward of the vehicle; and
      display representations of the predicted lane markers in the one or more display mirrors.

2. The rearward lane display system of claim 1, wherein the image sensor comprises a camera with an infrared light source.

3. The rearward lane display system of claim 1, wherein the one or more display mirrors comprise an interior rearview mirror assembly.

4. The rearward lane display system of claim 1, wherein the one or more display mirrors comprise a side exterior rearview mirror assembly.

5. The rearward lane display system of claim 1, wherein the one or more display mirrors comprise:
   a partially reflective and partially transmissive electro-optic mirror element; and
   a display configured to provide an overlay comprising the predicted lane markers.

6. The rearward lane display system of claim 1, wherein the processor is configured to process the one or more images captured from the image sensor by:
   receiving a present image from the image sensor;
   determining coordinates of lane marker edge points in the present image;
   modifying the coordinates to reflect a change in vehicle orientation between receiving the present image and a previous image; and
   fitting lines to the modified coordinates for display in the one or more display mirrors.

7. The rearward lane display system of claim 6, wherein determining coordinates of lane marker edge points in the present image comprises utilizing a lane marker detector to identify lane marker positions.

8. The rearward lane display system of claim 6, wherein modifying the coordinates to reflect a change in vehicle orientation between receiving the present image and a previous image comprises:
   establishing a coordinate system of the vehicle where an x-axis extends to the left and right of the vehicle, a y-axis extends below and above the vehicle, and a z-axis extends to a front and rear of the vehicle;
   rotating the coordinates about the x, y, and z axes; and
   translating the coordinates along the z axis.

9. The rearward lane display system of claim 6, wherein modifying the coordinates to reflect a change in vehicle orientation between receiving the present image and a previous image comprises removing lane marker edge points that exceed a predetermined distance from the vehicle.

10. The rearward lane display system of claim 6, wherein fitting lines to the modified coordinates for display in the one or more display mirrors comprises using a model including one or more of a pair of polynomials which compute an X and Y value for a given z value, a least squares regression, a linear regression, a Theil-Sen estimator.

11. A method for displaying rearward lane markers comprising:
   capturing one or more images including lane markers forward of a vehicle;
   processing the one or more images to predict where the lane markers will appear rearward of the vehicle; and
   displaying representations of the predicted lane markers in one or more display mirrors.

12. The method of claim 11, comprising using a camera with an infrared light source to capture the one or more images.

13. The method of claim 11, wherein displaying representations of the predicted lane markers in one or more display mirrors comprises providing an overlay of the predicted lane markers on a partially reflective and partially transmissive electro-optic mirror element.

14. The method of claim 11, comprising displaying representations of the predicted lane markers using an interior rearview mirror assembly.

15. The method of claim 11, comprising displaying representations of the predicted lane markers using a side exterior rearview mirror assembly.

16. The method of claim 11, wherein processing the one or more images captured from the image sensor comprises:
   receiving a present image from the image sensor;
   determining coordinates of lane marker edge points in the present image;
   modifying the coordinates to reflect a change in vehicle orientation between receiving the present image and a previous image; and
   fitting lines to the modified coordinates for display in the one or more display mirrors.

17. The method of claim 16, wherein determining coordinates of lane marker edge points in the present image comprises utilizing a lane marker detector to identify lane marker positions.

18. The method of claim 16, wherein modifying the coordinates to reflect a change in vehicle orientation between receiving the present image and a previous image comprises:
   establishing a coordinate system of the vehicle where an x-axis extends to the left and right of the vehicle, a y-axis extends below and above the vehicle, and a z-axis extends to a front and rear of the vehicle;
   rotating the coordinates about the x, y, and z axes; and
   translating the coordinates along the z axis.

19. The method of claim 16, wherein modifying the coordinates to reflect a change in vehicle orientation between receiving the present image and a previous image comprises removing lane marker edge points that exceed a predetermined distance from the vehicle.

20. The method of claim 16, wherein fitting lines to the modified coordinates for display in the one or more display mirrors comprises using a model including one or more of a pair of polynomials which compute an x and y value for a given z value, a least squares regression, a linear regression, a Theil-Sen estimator.

* * * * *